United States Patent [19]

Mennick

[11] 4,333,532

[45] Jun. 8, 1982

[54] FLEXIBLE HORSESHOE

[76] Inventor: Paul E. Mennick, 693 Woodbine Dr., San Rafael, Calif. 94903

[21] Appl. No.: 154,113

[22] Filed: May 28, 1980

[51] Int. Cl.³ .............................................. A01L 1/02
[52] U.S. Cl. ......................................................... 168/24
[58] Field of Search ................... 168/4, 6, 12, 13, 14, 168/24, DIG. 1

[56] References Cited

U.S. PATENT DOCUMENTS

| | | | |
|---|---|---|---|
| 952,208 | 3/1910 | Myer | 168/24 |
| 980,655 | 1/1911 | McDermott | 168/24 |
| 1,612,577 | 12/1926 | Hall | 168/12 |
| 3,494,422 | 2/1970 | Clark | 168/DIG. 1 X |
| 4,116,278 | 9/1978 | Spencer | 168/4 |

FOREIGN PATENT DOCUMENTS 1299836  12/1972  United Kingdom ......... 168/DIG. 1

*Primary Examiner*—Paul J. Hirsch
*Assistant Examiner*—Robert P. Swiatek
*Attorney, Agent, or Firm*—Melvin R. Stidham

[57] ABSTRACT

A flexible horseshoe of a resilient material contoured to fit the hoof as it exists in its natural, untrimmed and unshod state. The shoe is arched along both axes to facilitate flexing and to enable unrestricted movement of the hoof in three dimensions so as to provide superior shock absorbing characteristics.

8 Claims, 17 Drawing Figures

FLEXIBLE HORSESHOE

BACKGROUND OF THE INVENTION

Domestic horses have, for a great many years, been routinely shod with flat and relatively inflexible shoes of metal, plastic or the like. These horses have also long been plagued with various problems of lameness, many of which are related, directly or indirectly to the rigidity and non-resilience of the shoes without shock absorption characteristics. Feral horses, on the other hand, have a very low incidence of lameness, despite the fact that they often move 10 to 20 miles over very rough terrain. This is due, in part, to the fact that the hoofs of these horses when allowed to wear naturally, develope several shape and conformation characteristics which greatly enhance three-dimensional shock absorption, thus lessening stress and predisposition for various types of lameness involving the rest of the leg.

OBJECTS OF THE INVENTION

It is an object of this invention to provide a horseshoe which is capable of absorbing shocks of ground impact.

It is a further object of this invention to provide a horseshoe which is designed to decrease incidents of lameness in domestic horses.

It is a further object of this invention to provide a horseshoe which is capable of providing the three-dimensional shock absorbing capability of the unshod hoof.

Other objects and advantages of this invention will become apparent from the description to follow, particularly when read in conjunction with the accompanying drawings.

DRAWINGS

DESCRIPTION OF A PREFERRED EMBODIMENT

Figure 1:
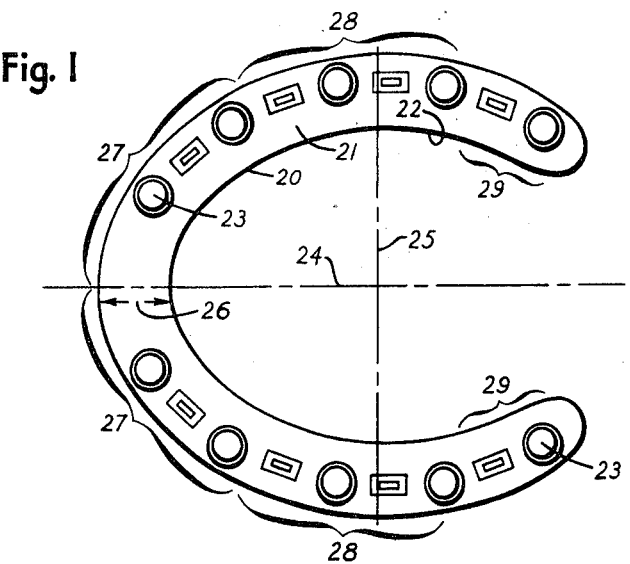
FIG. 1 is a bottom view of a horseshoe embodying features of this invention.
Figure 2:
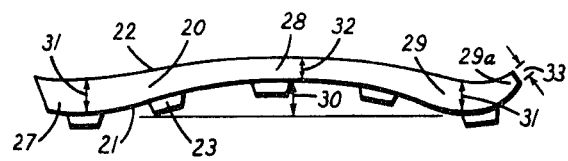
FIG. 2 is a side view of the horseshoe.

Referring now to FIGS. 1 to 4 with greater particularity the horseshoe 20 of this invention is of conventional horseshoe configuration molded or otherwise formed as an integral member of a resilient, tough wearing, flexible material, such as a suitable plastic. The shoe has a bottom or tread surface 21 and an upper or hoof surface 22. The bottom surface may be provided with traction cleats 23 which are molded as part of the shoe 22 providing additional traction, if desired. The shoe 20 has a major axis or length 24 which may be about 5½ inches and a minor axis or width 25 of approximately 5 inches, typically. The shoe may have a relatively uniform width 26 of, for example, about ⅜". It is to be understood, however, that the dimensions here cited are only by way of example and would, of course, vary according to hoof size. The horseshoe 20 has a toe portion 27, a quarter portion 28 and a heel portion 29, all as indicated in FIG. 1. Further, as indicated in FIG. 2, the horseshoe 20 is arched from toe portion 27 to heel portion 29 when undeformed, i.e. when not carrying weight. This concavity is most pronounced at or near the minor axis 25 where the bottom surface 21 is approximately ¼" when undeformed, above the level of the toe and heel portions 27, 29, which first contact the ground. However, this distance 30 can also be changed, in accordance with varying shock absorbing requirements and hoof properties. For general application in smaller horses, for example, this degree of arch would be more pronounced with approximately the same elevation at midarch in a shorter shoe. Shock absorption by longitudinal expansion of the hoof is more important in smaller horses where the hoof wall itself is thinner and more flexible.

It will be noted in FIG. 2 that the shoe heel also curls upward at 29a to conform to, and provide protection for, the rounded heel of a hoof in its natural state. Also as shown in FIG. 2, the shoe 20 is preferably of reduced thickness 32 at or near the minor axis 25 in order to facilitate flexing of the shoe. The shoe is of maximum thickness indicated by dimension 31 at the toe and heel portions 27 and 29 providing greater resistance to wear in these regions. Finally, the heel portion 29 reduces at 29a to a lesser dimension 33.

Figure 4:
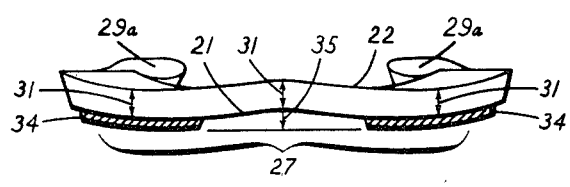
FIG. 4 is a front view of the horseshoe of FIG. 3.
Figure 5:
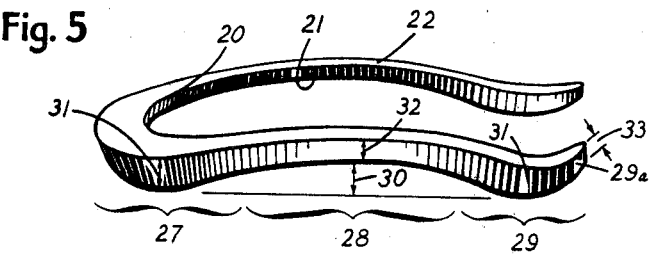
FIG. 5 is a side view of a horseshoe of this invention.

As illustrated in FIG. 4, the shoe is also preferably arched along the minor axis 25, i.e. across the toe portion 27 of the shoe to provide two toe subportions, each contacting the ground. Generally, this arch is less pronounced than that from front to rear but, again, the degree of arch can vary to accommodate different requirements, being relatively unimportant in shoes for larger horses. In addition, the thickness of the shoe, indicated by dimension 31 is relatively uniform across the toe portion because resistance to wear in this region is of greater importance then flexibility.

Figure 3:
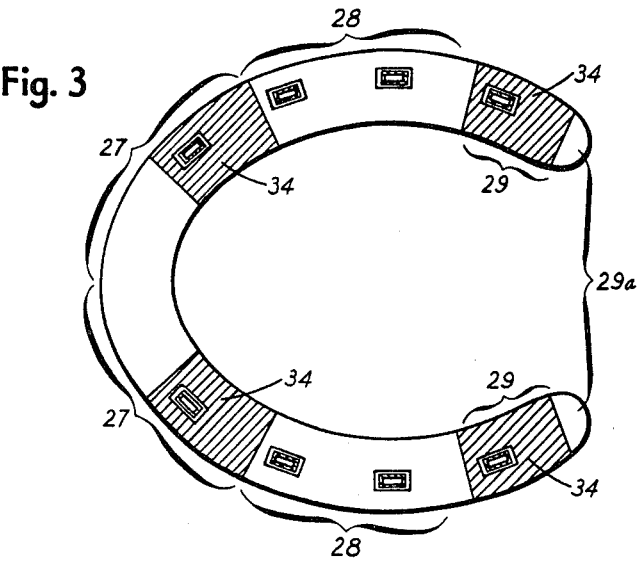
FIG. 3 is a bottom view of another horseshoe embodiment.

As shown in FIG. 3, a plurality of metal wear plates 34 may be bonded to the horseshoe in the toe and heel region to further increase resistance to wear and to provide an area of ground contact, particularly where the horse is ridden or otherwise used on concrete or asphalt. By placing the plates 34 just in the toe and heel areas and not in the arched portions, they do not interfere with the flexing of the horseshoe.

Figure 6A:
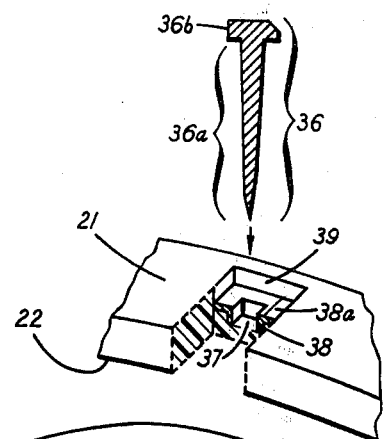
FIG. 6a is an enlarged partial view of the horseshoe showing a nail hole.
Figure 6:
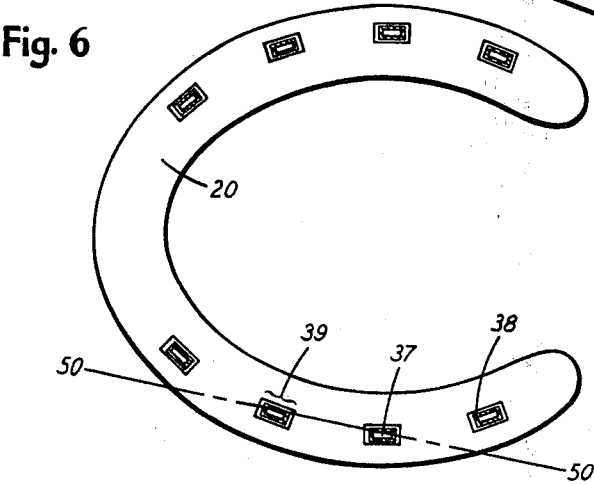
FIG. 6 is a bottom view of the horseshoe.
Figure 7:
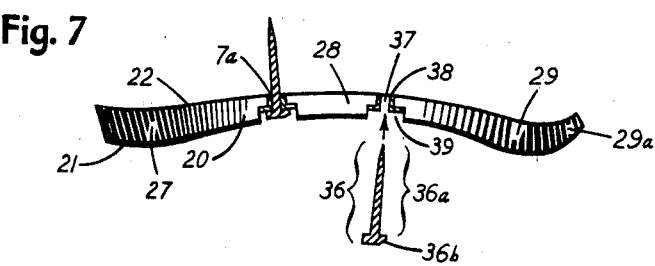
FIG. 7 is a section view taken along line 50—50 of FIG. 6.

Referring now to FIGS. 6 and 6A, the shoe may be attached to the hoof by means of conventional horseshoe nails 36 driven through holes 37, which are molded into the shoe to accommodate the shaft of the nail. The holes 37 may be provided with metal sleeves 38 which are just large enough to accommodate the nail shaft 36a, the sleeve 38 being provided with a metal flange 38a against which the head 36b of the nail is driven. The flange prevents a farrier, a pebble or excessive shoe wear from driving the sleeve 38 into the hoof. The head 36b of the nail is accommodated by a recess 39 surrounding the nail hole 37. The recess 39 is deep enough that the nail head 36b is countersunk below the bottom surface 21 of the horseshoe, but it prevents the nail 36 from being driven completely through the shoe opening 37. This is illustrated in FIG. 7.

If desired, adhesive may be applied between the upper or hoof surface at the time of application, to further augment the attachment strength, and to preclude the entry of foreign particles between the hoof and the shoe, particularly during the course of flexing and expansion of the shoe as weight is successively brought to bear and released. It should also be noted that the nails 36 can be placed well back in the heel region 29 (FIG. 6) to enhance the attaching strength. In conventional horseshoes nails are not placed here in order to allow for some lateral expansion of the heels. However, it is possible here because of the previously described characteristics of the shoe, which inherently enable shock absorbing and flexibility.

Figure 8:
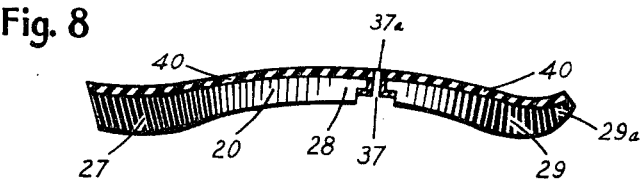
FIG. 8 is a side view of the horseshoe with a resilient top pad added.
Figure 8A:
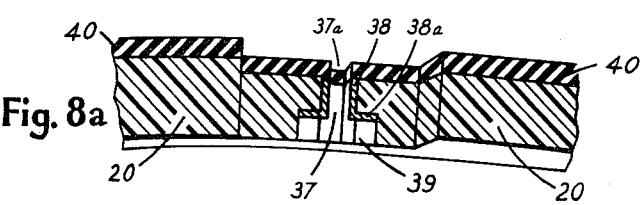
FIG. 8A is an enlarged section view of the horseshoe of FIG. 8.
Figure 9:
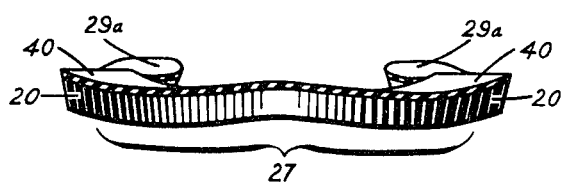
FIG. 9 is a front view of the horseshoe of FIG. 8.

Referring now to FIGS. 8 and 9, a resilient pad or the like may be placed over the entire top or hoof surface of the shoe 20. The pads may selectively be of material to provide more stiffness to the shoe 20 by limiting the flexibility characteristics or they may be of a resilient material such as rubber, to render the shoes more resilient. In any event, the pad 40 has nail holes 37a which correspond to the nail holes 37 of the shoe. In addition, adhesive could be applied to both surfaces of the pad, i.e. between the pad and the hoof and between the pad and the shoe.

Figure 10:
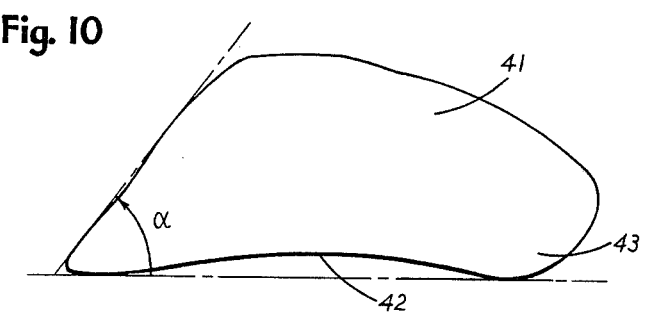
FIGS. 10 and 11 are side and front views respectively of a horse's hoof properly trimmed for application of the shoe.
Figure 11:
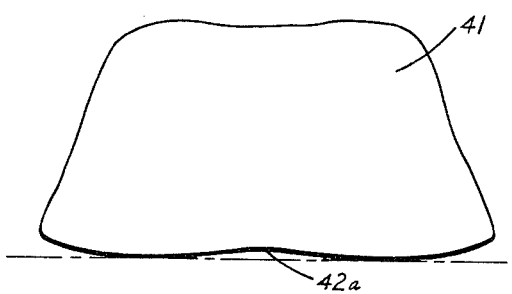
Figure 12:
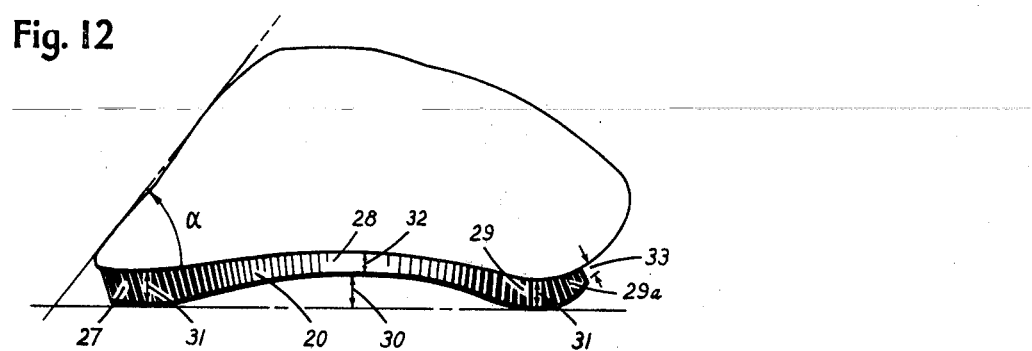
FIGS. 12 and 13 are side and front views, respectively, of the shod hoof with shoe undeformed.
Figure 13:
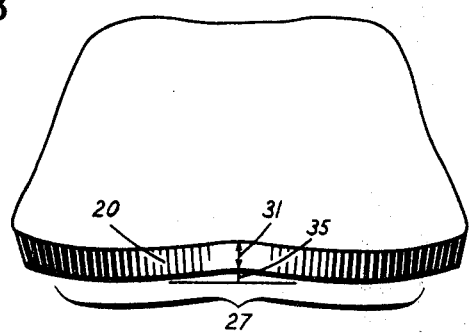
Figure 14:
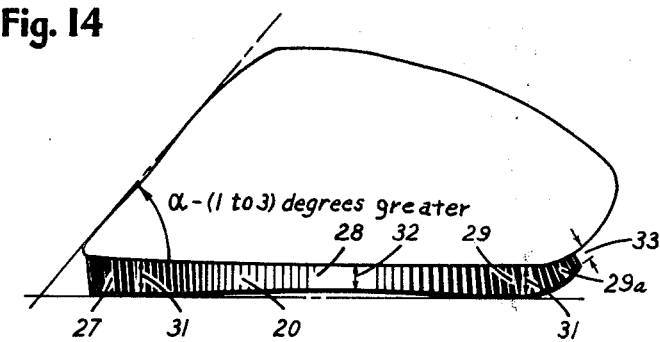
FIGS. 14 and 15 are side and front views, respectively, of the shod hoof bearing weight.
Figure 15:
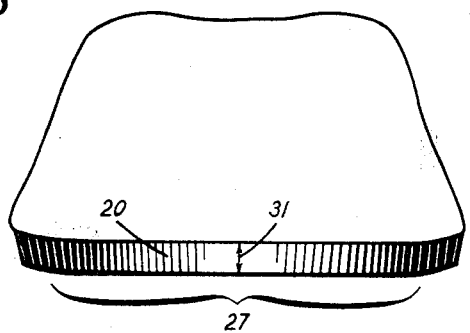

Referring now to FIGS. 10 and 11, the hoof 41 itself should be trimmed prior to application of the shoe so as to be arched, substantially in conformance therewith. Specifically, the hoofs should be trimmed so that it arches fore to aft at 42 and, in the case of small horses from side to side as indicated at 42a. In addition, the hoof angle should be 1 to 3 degrees greater than normal because the arch of the hoof will tend to straighten it and allow the angle to return to its normal value upon impact.

It is this combination of a flexible shoe and curved hoof floor which allows both a change in angle α and three-dimensional expansion of the hoof as weight is put upon it, thus very effectively absorbing shock. This is illustrated in FIGS. 12-15.

While this invention has been described in conjunction with a preferred embodiment thereof, it is obvious that modifications and changes therein may be made by those skilled in the art to which it pertains, without departing from the spirit and scope of this invention, as defined by the claims appended hereto.

What is claimed is:

1. A horseshoe comprising:
a generally U-shaped body of a resilient, flexible material;
a pair of toe portions at the forward end of said body and formed by the body;
toe support surfaces on the undersides of said toe portions each providing an area of ground contact;
heel portions at the trailing ends of said body; and
heel support surfaces on the undersides of said heel portions providing areas of ground contact;
said shoe, when undeformed, having fore to aft arched portions in the legs of said U-shaped body generally centrally of each of said toe portions and one of said heel portions to enable flexing thereof.

2. The horseshoe defined by claim 1 wherein:
said body is of reduced thicknesses in the arched portions thereof.

3. The horseshoe defined by claim 1 wherein:
said trailing ends rearward of said heel support surfaces curve upward when undeformed.

4. The shoreshoe defined by claim 1 wherein:
there is a laterally arched region in between said toe portions.

5. The horseshoe defined by claim 1 including:
a series of nail holes around said U-shaped body;
an enlarged recess around each of said nail holes;
a complementary metal plate received in each of said recesses;
each of said plates having a central tubular extension received in one of said nail holes.

6. The horseshoe defined by claim 1 including:
spaced metal wear plates attached to the underside of said body in said toe portions and heel portions.

7. The horseshoe defined by claim 1 including:
a plurality of cleats protruding from the underside of said body.

8. The horseshoe defined by claim 1 including:
a resilient pad secured to the upper surface of said body.

* * * * *